United States Patent
Katz et al.

(10) Patent No.: US 6,714,481 B1
(45) Date of Patent: Mar. 30, 2004

(54) SYSTEM AND METHOD FOR ACTIVE SONAR SIGNAL DETECTION AND CLASSIFICATION

(75) Inventors: Richard A. Katz, East Lyme, CT (US); Albert H. Nuttal, Old Lyme, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/263,299

(22) Filed: Sep. 30, 2002

(51) Int. Cl.[7] .......................... G01S 15/89; G01S 15/06
(52) U.S. Cl. .......................... 367/88; 367/100; 367/131
(58) Field of Search .......................... 367/87, 88, 100, 367/131; 702/14

(56) References Cited

U.S. PATENT DOCUMENTS 4,054,862 A  * 10/1977  Backman, Jr. .............. 367/100

OTHER PUBLICATIONS

Caughey et al., "Blind Deconvolution of Echosounder Envelopes", Acoustics, Speech and Signal Processing, 1996 ICASSP–96, 1996 IEEE International Conf., vol. 6, May 1996, p. 3149–3152.*

Alpher, P., "A Consideration of the Discrete Volterra Series", IEEE Transactions on Automatic Control, Jul. 1965, pp. 322–327.*

Morgan, D., "On Discrete–Time Amplifiers", Circuits and Systems, IEEE Transactions on, vol. 22, Issue:2, Feb. 1975, pp. 135–146.*

* cited by examiner

*Primary Examiner*—Ian J. Lobo
(74) *Attorney, Agent, or Firm*—James M. Kasischke; Michael F. Oglo; Jean-Paul A. Nasser (57) ABSTRACT

A sonar system and method are provided to extract and identify information about a particular target illuminated by an active sonar system. The present invention utilizes a Volterra Series Expansion in conjunction with a least squares procedure to estimate channel and target responses, which may be linear or nonlinear. The system estimates the channel and target responses for different orders of the Volterra Series Expansion and then selects the order for which a minimum error is determined with respect to a measured acoustic return signal. The system requires as inputs only the excitation waveform and the measured acoustic return signal.

20 Claims, 2 Drawing Sheets

SYSTEM AND METHOD FOR ACTIVE SONAR SIGNAL DETECTION AND CLASSIFICATION

STATEMENT OF THE GOVERNMENT INTEREST

The invention described herein may be manufactured and used by or for the Government of the United States of America for Governmental purposes without the payment of any royalties thereon or therefore.

BACKGROUND OF THE INVENTION (1) Field of the Invention

The present invention relates generally to systems and methods for active sonar systems and, more particularly to a sonar system which utilizes a Volterra model for improved sonar signal detection and classification.

(2) Description of the Prior Art

Active sonar signal propagation and reflection have intrinsic properties that are notably affected by the channel and/or target characteristics. Often, one knows through measurements, the signal transmitted into the propagation channel and the waveform at the receiver output. The difficulty is to accurately measure, estimate, and characterize what happens between the excitation input and output.

Signal distortion in an active sonar system may arise for many reasons such as, for example, irregular sea bottoms and surface interactions, nonlinear resonant scattering within the propagation channel, reverberation, nonhomogenous responses due to channel and/or target interactions, target scattering profiles, multipath reflections, noise generated by waves, transmission losses, changing distances from the target, and the like.

Active sonar as used herein refers to sonar systems that utilize radiating acoustic sources to probe an area to be searched so as to illuminate the submerged object. One example of this type of sonar system is a conventional sonar device wherein a highly directional beam of sonic energy periodically radiates from a scanning transducer which in turn also operates as a receiver to detect echoes reflected from any object(s) within the propagation channel. Modern active sonar systems commonly provide multibeam capabilities as well. Sonar devices tend to have relatively high transmission losses which increase as a function of the frequency of the propagated energy.

A large number of active sonar data processing techniques rely on linearity in an acoustic signature (e.g., temporal fluctuations, power spectra) for extracting and identifying information about a particular target illuminated by the active transmission. However, if linear techniques are applied to a target-of-interest in which the target and/or channel response is actually nonlinear, then subsequent purely linear processing of these data leads to results that can be incorrect and misleading.

Various inventors have attempted to solve the above and related problems as evidenced by the following patents.

U.S. Pat. No. 4,195,359, issued Mar. 25, 1980, to Miller et al., discloses an automatic echo detection and classification system wherein sonar equipment transmits pulses toward a target in predetermined and equal time intervals and receives background, dopplered and undopplered echoes which are produced as video output and audio output, the improvement which comprises means for establishing a non-directional background reference signal voltage from the video output, means for separating the audio output into dopplered signal voltage outside the reverberation band and undopplered signal voltage within the reverberation band, means for algebraically adding the background reference signal voltage to both the dopplered and undopplered signal voltages, a first amplifier for the resultant dopplered signal voltage, a target indicator alarm, a first energizing circuit therefore operative by the amplified dopplered signal voltage to indicate that a target has been located, means for obtaining from the resultant undopplered signal voltage a selected signal voltage above a predetermined level, a first gate normally in closed position, a first multivibrator therefore and operable by the selected undopplered signal voltage to move to open position for a predetermined interval to pass a first echo of a predetermined duration, a second gate normally in open position for passing the first echo after it has passed the first gate, a second multivibrator for the second gate operative to close the second gate for a predetermined period, an amplifier for the undopplered signal voltage of the first echo after it has passed through both the first and second gates, a second energizing circuit for the target alarm, said second circuit including the second multivibrator, and being operative to energize the second multivibrator by the amplified undopplered signal voltage of the first echo after it has passed through the second gate and after the predetermined period for which the second gate is closed and a second echo appears, which is substantially within the same range as the first echo, the second gate will be open for passing of the second echo to operate the target indicator alarm.

U.S. Pat. No. 4,654,835, issued Mar. 31, 1987, to Paul L. Feintuch, discloses a bistatic sonar employing LMS adaptive spatial prediction which is used to process against surface reverberation from the convergence zone (CZ). Hydrophones spatially separated from the primary array are used as references. The critical behavior exploited by the invention is that since the reverberation may be viewed as an extended source for the reverberation, the correlation drops off with separation between the reference and primary sensors, while it stays constant for the plane wave target return. The reverberation is non-stationary, functionally dependent on the signal (even though the backscatter is statistically uncorrelated with the signal), and spatially extended over the sector of the CZ annulus cut out by the transmitter azimuth beamwidth. The detection of the target is based on the sudden appearance of one strong target point source within a densely packed region of weak point sources that have been constantly present and whose sum is much larger than the target. The use of more than a single reference leads to a minimal improvement in detection performance and may actually degrade performance due to increased algorithm noise. Detection performance tends to increase with increasing separation distance between the primary and the reference hydrophone. For signal, reverberation, and algorithm parameters consistent with modern active sonars operating in the CZ mode, the spatial prediction approach to detection of the plane wave signal will allow detection of targets not possible using conventional active processing, provided the reference hydrophone can be placed to give a normalized correlation of less than 0.05. Such values may be obtained with very reasonable spacing between primary and reference, allowing the reference to be positioned, for example, along the hull aft of the primary array.

U.S. Pat. No. 4,686,532, issued Aug. 11, 1987, to Alastair D. McAulay, discloses a sonar or radar that permits primary distributed scatterers that are close to the sonar or radar, relative to the array dimension, to be rapidly and accurately located and pertinent characteristics to be estimated, such as Doppler and complex scattering strength. The region viewed is partitioned in annuli instead of in angular pie-shaped slices as is normally the case for conventional sonar. This avoids the difficulty with conventional sonar or radar of distinguishing whether a scatterer is in a side lobe or in the main beam in the important case of approaching multiple scatterers, e.g. robotic vehicle sensors or torpedo terminal homing on a target, because near regions may be examined in all directions prior to regions further out. Computational speed is achieved by utilizing precomputation and leaving only part of the computation to be performed in real time.

U.S. Pat. No. 4,969,131, issued Nov. 6, 1990, to William G. Harris, Jr., discloses an echo ranging system of the invention which comprises circuit means to differentiate between shadows cast by objects and the period of time prior to the receipt of the first bottom return, as well as the lack of bottom reverberation for other reasons. Additional circuit means determines if the length of the shadow signals in comparison to their range exceeds a predetermined value. Circuit means are also included to produce a first electrical signal when such shadow signals are received. Further circuitry analyzes the shadow signals for which the first electrical signals were provided and produces a second electrical signal when said object shadow signals exceed in number or length a predetermined value. Additional circuit means are provided to convert said first and second electrical signals to suitable audible signals which may be readily distinguished, one from the other.

U.S. Pat. No. 4,972,385, issued Nov. 20, 1990, to Willis A. Teel, discloses a sonar system having signal analyzing circuitry rendering the system responsive to objects of a predetermined size. The signal analysis is accomplished by a spectral analysis of the echo signals returned from the objects. In particular, the relative height of adjacent side lobes of echo signals energy returned to the sonar are compared to indicate the size of the object reflecting the signal.

U.S. Pat. No. 5,047,993, issued Sep. 10, 1991, to Robert Halley, discloses an array of sonar transmitting and receiving transducers that are so physically arranged and their signal voltage so combined as to form beams pointing to various points of the compass. A signal is formed on a different conductor for each beam and the conductors are wiped in rapid succession to determine the presence of any beam signal. Since any signal may be short-lived, the total sampling process must be in milliseconds. Any signal that occurs is converted to digital form and is fed into a first recirculating delay line time compression storage loop. All signals are stored in the first loop. Then the cluster of signals pertaining to one beam is read out to a second recirculating delay line time compression storage loop from which it is read out to a variable frequency super-heterodyne and displayed on a cathode ray tube.

U.S. Pat. No. 5,165,051, issued Nov. 17, 1992, to Rajendra Kumar, discloses a method and associated apparatus for accurately and quickly estimating the amplitude, frequency and phase of a signal of interest. The method comprises the steps of inputting the signal of interest; generating a reference signal with adjustable amplitude, frequency and phase at an output thereof; mixing the signal of interest with the reference signal and a signal 90 degree out of phase with the reference signal to provide a pair of quadrature sample signals comprising respectively a difference between the signal of interest and the reference signal and a difference between the signal of interest and the signal 90 degree out of phase with the reference signal; using the pair of quadrature sample signals to compute estimates of the amplitude, frequency, and phase of an error signal comprising the difference between the signal of interest and the reference signal employing a least squares estimation; adjusting the amplitude, frequency, and phase of the reference signal from the numerically controlled oscillator in a manner which drives the error signal towards zero; and, outputting the estimates of the amplitude, frequency, and phase of the error signal in combination with the reference signal to produce a best estimate of the amplitude, frequency, and phase-of the signal of interest. The preferred method includes the step of providing the error signal as a real time confidence measure as to accuracy of the estimates wherein the closer the error signal is to zero, the higher the probability that the estimates are accurate. A matrix in the estimation algorithm provides an estimate of the variance of the estimation error.

U.S. Pat. No. 5,444,669, issued Aug. 22, 1995, to Donald G. Polvani, discloses a torpedo relative position measuring system, including an active sonar system and a passive magnetic system, which is coupled to computing apparatus which operates in response to a set of stored computer programs, all located in the torpedo for homing in on a ferrous target. At long ranges and mid ranges, the torpedo is directed to the target by the sonar system, while at near ranges, the magnetic system determines the x, y, z, relative position coordinates between the target and the torpedo in accordance with a calibrated stored magnetic model of the target and numerical solution of the non-linear equations linking the target's magnetic field, as measured at the torpedo, with the target's relative position. Guidance information derived therefrom is then fed to the torpedo's guidance system. With the magnetic system providing the relative position of the target at close range, the torpedo's normal guidance system can readily steer the torpedo to a desired hit point on the target.

U.S. Pat. No. 5,612,928, issued Mar. 18, 1997, to Haley et al., discloses a method and apparatus for classifying objects in images utilizing means for selecting portions of those images which contain objects and means for classifying those objects based upon parameters of the selected portions, which parameters are useful for classifying the objects. The selecting means preferably is a shadow and highlight detector, a statistical window detector and a neural network window detector whose output is combined in a combined cue. The parameters are determined from the grey levels and positions of pixels using one or more modules which perform certain mathematical operations on this data. Such parameters include edge parameters, smoothness, clutter, presence and characteristics of highlights and shadows, and texture. The invention is particularly useful for classifying objects in sonar images as natural or man-made.

U.S. Pat. No. 5,886,661, issued Mar. 23, 1999, to Harrison et al., discloses a detection and classification system for underwater objects which uses a transmitting unit and a receiving unit. The transmitting unit comprises a waveform generator, a power amplifier, and a transmitting antenna. The receiving unit comprises a receiving antenna, a preamplifier, a first harmonic suppressor, a digitizer, and a computer. The transmitting unit radiates an analog electromagnetic wave signal into a conductive medium such as seawater which the receiving unit detects and analyzes by a differential spectral analysis after conversion of the signal into binary code. The system uses a signal-processing method which includes the steps of determining the size of the underwater object to be detected, transmitting an electromagnetic wave with a wavelength proportioned to the size of the object, performing a spectral analysis of the received signal, performing a spectral analysis at a different time or different location, comparing the two spectra performed, and analyzing the difference between the two spectra.

U.S. Pat. No. 6,096,085, issued Aug. 1, 2000, to Gary Steven Sammelman, discloses a computer-readable software stored on a storage medium and executed on a computer to perform an integrated sonar simulation, including a parameter definition code for defining a plurality of parameters of a sonar, target and sonar environment, and a Signal to Noise Ratio (SNR) computation code for computing a SNR of the sonar as a function of range to target, based upon the parameters defined by the parameter definition code. The parameters defined by the parameter definition code include ambient noise, volume scattering strength of the sonar environment, sound velocity profile of the sonar, beam patterns of both projector and receiver of the sonar, type of sonar, range resolution of the sonar, number of eigenrays striking the surface and bottom of the sonar environment, number of eigenrays striking the target, ray trajectories to the target, and surface and bottom scattering strength as a function of angle. The software also includes a target strength model generating code for computing scattering from a selected complex target of a stored set of complex target selections, to thereby generate a target strength model for the selected complex target.

However, the above references do not adequately solve the problem of sonar signal distortions. Consequently, there remains a long felt but unsolved need for a system capable of detecting and identifying target(s) of interest whether or not nonlinearity is present in the acoustic signature. Those skilled in the art will appreciate the present invention that addresses the above and other problems.

SUMMARY OF THE INVENTION

Accordingly, it is an objective of the present invention to provide an improved sonar system and method.

Another objective is to provide a system and method as aforesaid which is operable for determining a target signature whether the channel response or the target response or both are nonlinear or linear.

A further objective is to provide a system and method as aforesaid that is not limited as to the acoustic waveform transmission type used by an active sonar system.

These and other objectives, features, and advantages of the present invention will become apparent from the drawings, the descriptions given herein, and the appended claims. However, it will be understood that above listed objectives and advantages of the invention are intended only as an aid in understanding aspects of the invention, are not intended to limit the invention in any way, and do not form a comprehensive list of objectives, features, and advantages.

In accordance with the present invention, a method is provided for detecting sonar signals which may comprise one or more steps such as, for instance, providing an excitation signal for in-water transmission of an acoustic signal, providing a signal produced responsively to the in-water transmission of the acoustic signal, and/or utilizing the response signal and the excitation signal in a Volterra Series Expansion for determining a plurality of impulse responses of different orders.

The method may further comprise utilizing a least squares method in conjunction with the Volterra Series Expansion for determining the plurality of impulse responses and/or determining a least squares error by comparing the plurality of impulse signals with the response signal. Other steps may further comprise progressively solving for higher orders of the plurality of impulse responses and/or determining which order of the plurality of impulse response minimizes the squared error. Additional method steps may further comprise selecting a Volterra Series Expansion of order k and forming a system of matrix equations and/or linearly manipulating the matrix equations. According to the present invention, the excitation signal and the response signal are the only signals required for the determination of the plurality of impulse responses.

Thus, a sonar system is provided for detecting sonar signals which may comprise a plurality of elements such as, for instance, a first data input corresponding to a transmitted channel input acoustic signal, a second data input corresponding to a measured channel output acoustic signal produced responsively to the transmitted acoustic signal, and a processor operable for utilizing a Volterra Series Expansion to compute a plurality of channel and target impulse responses from the first data input and the second data input. The processor is operable for comparing the plurality of channel and target impulse responses with respect to the second data input for determining an error signal.

The processor determines the plurality of channel and target impulse responses for each of a plurality of orders and then determines at which of the plurality of orders, the error signal is minimized. The transmitted acoustic signal may be of different types of signals: such as a continuous wave signal, a frequency modulated signal, or a white Gaussian signal.

In other words, a method is provided for detecting sonar signals by estimating a channel response and a target response for an underwater acoustic signal. This method comprises one or more steps such as, for instance, providing an excitation signal for in-water transmission of an acoustic signal, providing a return signal produced responsively to the in-water transmission of the acoustic signal, and determining an estimated channel response and estimated target response with a Volterra Series Expansion.

Other steps may include comparing the estimated channel response and the estimated target response with the return signal to determine an error, determining the Volterra Series Expansion at each of the plurality of orders, and/or selecting an order from the plurality of orders for which the error is minimized.

The method may further comprise utilizing the estimated channel response and the estimated target response to estimate the channel noise and/or for determining an acoustic signature of the target. In accord with the present invention, the acoustic signature is accurately determined even when the channel response or the target response or both are nonlinear.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout several views of the drawings and wherein.

BRIEF DESCRIPTION OF THE PREFERRED EMBODIMENTS

The proposed system and method incorporates a robust methodology for detecting and identifying target(s)-of-interest when nonlinearity is present in the acoustic signature. The present invention also detects, with high precision, linearity in the acoustic signature as well. The technique utilized in the present invention, and described fully in the following section, can be used for a wide range of waveform transmission types (e.g., frequency modulated (fm), continuous wave (cw), white Gaussian). The method incorporates a Volterra model for characterizing the channel/target response function based on a least squares fit to real acoustic time series measurements, in which the excitation input waveform is known, as is the output response of the receiving hydrophone element or array.

Figure 1:
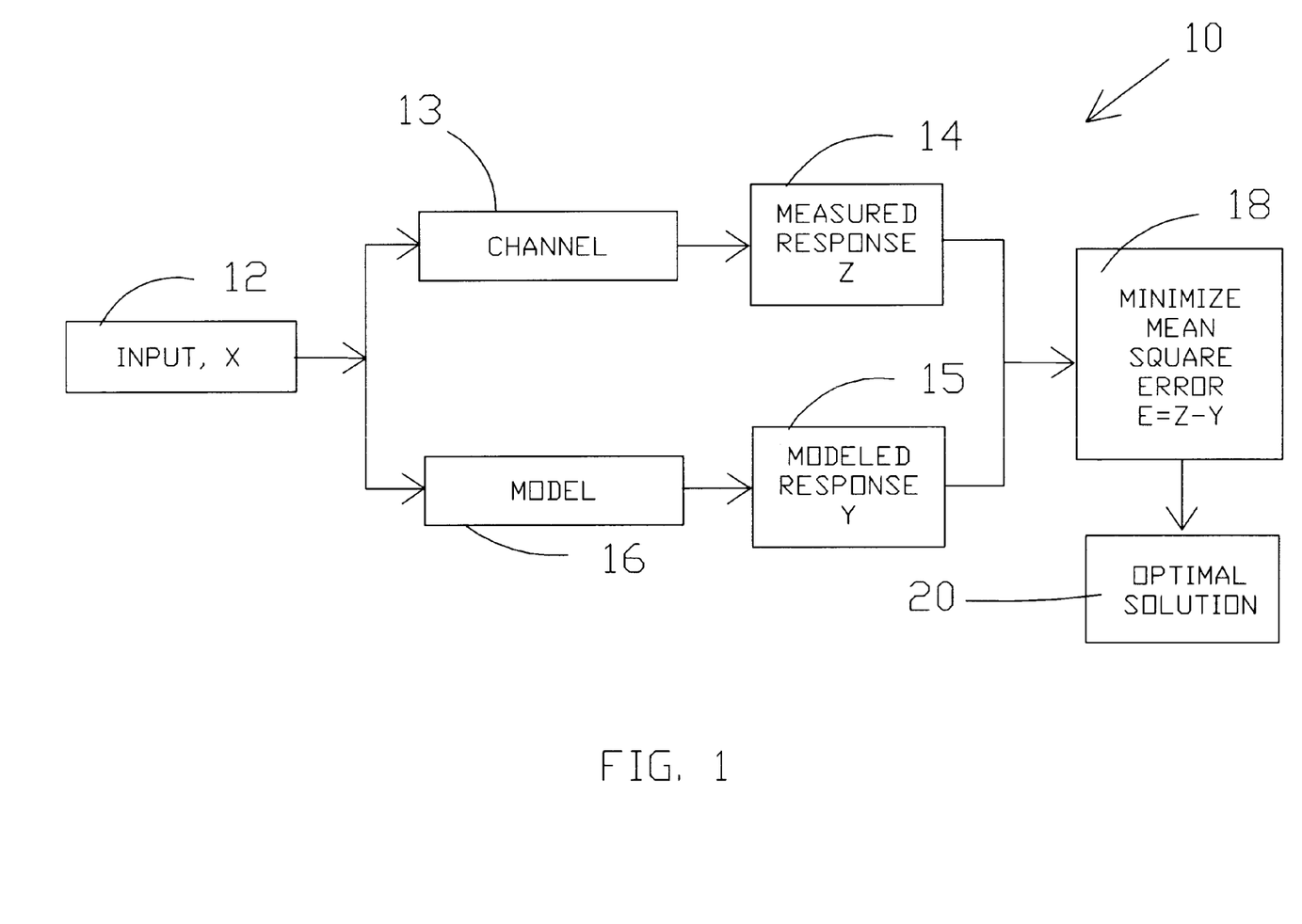
FIG. 1 is a block diagram schematic showing a presently preferred method and apparatus for a detection enhancement method and apparatus in accord with the present invention.

Referring now to FIG. 1, there is shown detection enhancement system 10 in accord with a presently preferred embodiment of the invention and provides a block diagram for a detection enhancement method and apparatus in accord with the present invention. One significant advantage of the present system over prior art systems is that instead of making assumptions or providing additional equipment, system 10 operation requires data that is readily known. Thus system 10 requires for operation only excitation input waveform 12, i.e., the transmitted signal 12, and output response 14 as detected by the hydrophone element or array. A modeled response 15 is produced by model 16.

The present invention uses a "least squares" approach in which acoustic time series measurements are fitted by model 16 based on a Volterra series expansion, including higher-order kernels. Model 16 determines channel and/or target impulse responses, $h_K(t; \tau_1, \ldots, \tau_K)$, K=1,2 ... n for a given excitation x(t), and response y(t). Model 16 is used for minimizing the Mean Square Error between modeled response z(t) and the actual channel output, z(t). Starting with the most general case, (see equation (1) below), we allow for time variation of the channel and a variety of additive and multiplicative noise types.

$$y(t) = h_0(t) + \sum_K \int \ldots {}^{(K)} \int d\tau_1 \ldots d\tau_K h_K(t; \tau_1, \ldots, \tau_K) x(t - \tau_1) \ldots x(t - \tau_K) \quad (1)$$

From equation (1), one deduces a variety of noise types:

$$h_0(t) = h_{0D} + h_{0R}(t) \quad (2)$$

where:

$h_{0D}$ is a constant additive deterministic component, and $h_{0R}(t)$ is a stationary random process of zero mean (without loss of generality).

Note that $h_{0R}(t)$ takes the place of additive noise, n(t). Next consider:

$$h_1(t;\tau_1) = h_{1D}(\tau_1) + h_{1R}(t;\tau_1) \quad (3)$$

where:

$h_{1D}(\tau_1)$ is a nonrandom first-order deterministic filter, and $h_{1R}(t;\tau_1)$ is a stationary random process of zero mean (without loss of generality).

The output corresponding to $h_{1R}(t;\tau_1)$ is given by the following expression:

$$y_{1R}(t) = \int d\tau_1\, h_{1R}(t;\tau_1) x(t-\tau_1) \quad (4)$$

where the integrand of equation (4) represents multiplicative noise of first-order.

Similarly, we can have multiplicative noise of second-order by breaking $h_2(t;\tau_1, \tau_2)$ into a deterministic and a random component. For the higher-order kernels, one obtains:

$$h_K(t;\tau_1, \ldots, \tau_K) = h_{KD}(\tau_1, \ldots, \tau_K) + h_{KR}(t;\tau_1, \ldots, \tau_K) \quad (5)$$

where $h_{KD}(\tau_1, \ldots, \tau_K)$ is a k-th order deterministic filter, and $h_{KR}(t;\tau_1, \ldots, \tau_K)$ is a random filter of zero mean.

Note that the latter term on the right-hand side of equation (5) will yield multiplicative noise of order k.

For a number of sonar problems of practical interest, we can avoid the vagaries of a time-variant channel. Therefore, to simplify the present analysis, we shall disregard all random noise contributions, $h_{KR}(t;\tau_1, \ldots, \tau_K)$. By doing so, we accept these omissions as the natural contributions to measurement and estimation errors induced by the model. This leads to the following expression:

$$y(t) = h_0(t) + \sum_K \int \ldots {}^{(K)} \int d\tau_1 \ldots d\tau_K h_K(\tau_1, \ldots, \tau_K) x(t - \tau_1) \ldots x(t - \tau_K) \quad (6)$$

The computed kernels, $\{h_K(\tau_1, \ldots, \tau_K)\}$, as indicated in FIG. 1 at model 16, are represented in this sonar context by the channel response, target response, or interaction of the two together. The least squares error, obtained by fitting with different orders is demonstrated below, first for the case of a general waveform excitation and then for the case of a white Gaussian excitation.

The least squares solution for a general excitation is performed by fitting the Volterra model (equation (6)) to actual data measurements, z(t), and solving for the kernel solutions of successively higher order. The optimal solution 20 occurs at the proper kernel order in which the least squares error is minimized 20 as indicated in FIG. 1. For example, we define the instantaneous error as:

$$e(t) = y(t) - z(t) \quad (7)$$

The mean square error, MSE is:

$$E = \overline{e^2(t)} = \overline{[y(t) - z(t)]_2} \quad (8)$$

We now choose kernels $\{h_K(\tau_1, \ldots, \tau_K)\}$ to minimize E as indicated at 18. That is, we select a model expansion containing the kernels up to a particular order k with a selected memory length in units of time, τ. we then form a system of matrix equations, Z=AH, whereby Z is an (N−k)×1 matrix of the received signal of data length (N−k) and k is a time index that accounts for the transient rise and decay. Matrix A represents an (N−k)×M matrix comprised of components and various products of the excitation, x(t−τ₁), according to order and memory length, and H is an M×1 matrix that comprises the modeled kernels of the expansion. For example, consider the least squares solution for the Volterra expansion of order 3 and memory length 4. We shall call this model Volt_3_4. The table below shows how the equations are set up in matrix form to obtain the best-fit solution. The transient index for this example is k=9.

$$\begin{bmatrix} z(10) \\ z(11) \\ \\ \\ \\ \\ z(N) \end{bmatrix} = \begin{bmatrix} 1 & x(10) & x(9) & x(8) & x(7) & x(6) & x^2(10) & [x(10)x(9)] & \cdots \\ 1 & x(11) & x(10) & x(9) & x(8) & x(7) & x^2(11) & [x(11)x(10)] & \cdots \\ \\ \\ \\ \\ 1 & x(N) & x(N-1) & x(N-2) & x(N-3) & x(N-4) & x^2(N) & [x(N)x(N-1)] & \cdots \end{bmatrix} \cdot \begin{bmatrix} h_0 \\ h_1(0) \\ h_1(1) \\ h_1(2) \\ h_1(3) \\ h_1(4) \\ h_2(0,0) \\ h_2(0,1) \\ \vdots \end{bmatrix} \quad (9)$$

$$[(N-9)\times 1] = [(N-9)\times 56] \cdot [(56\times 1)]$$

Notice in this example that there are 56 entries (unknowns) for the kernels. For a memory length of 4, there are the corresponding number of kernels for order 3: one for $h_0$ (i.e., dc component); 5 for $h_1(\tau_1)$ in which $\tau_1$=0,1,2,3,4; 15 for $h_2(T_1, \tau_2)$ in which $\tau_1$=0,1,2,3,4 and $\tau_2$=0,1,2,3,4, $\tau_1 \leq \tau_2$; and similarly 36 for $h_3(\tau_1, \tau_2, \tau_3)$, yielding a total of 56 kernels altogether. There are an equal number of column entries in the matrix A. Notice also that the known quantities are given by the received waveform, matrix Z and the excitation waveform, matrix X. Even though the terms in X are nonlinear, the solutions for the kernels in H are determined by linear manipulation of the matrix equation Z=AH.

Figure 2:
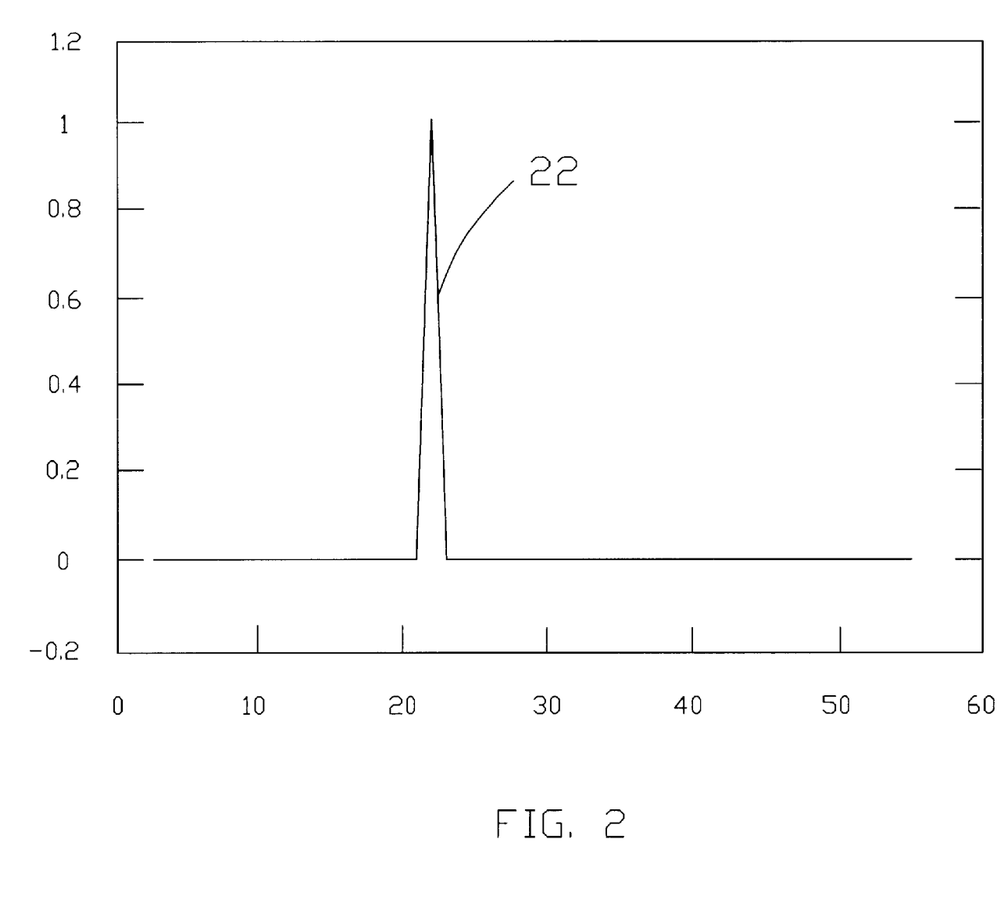
FIG. 2 is a waveform showing operating results of the method and apparatus of FIG. 1 wherein a kernel value with a maximum peak occurs at kernel 22 and all other kernels are zero.

As an example, we fitted the Volt_3_4 model to a simulated cubic nonlinearity (i.e., $z(t)=x^3(t)$) and plotted in FIG. 2 the subsequent kernel values (y-axis) versus the kernal arguments (x-axis) after performing a least squares fit. In the simulation, we selected a model fit in which there was a perfect match between y(t) and z(t). That is to say, we deliberately forced the error to be zero to see if results were consistent with expectations. The results in FIG. 2 show a kernel value with a maximum peak 22 at kernel argument number 22 and zero for all other kernel values. This is consistent with a cubic nonlinearity, in which kernel argument number 22 shows a maximum peak and all other kernels are zero. Therefore we observe modeled results that are consistent with that expected for a simulated response, $z(t)=x^3(t)$, namely zero error. We also observe that kernel argument number 22 corresponds to $h_3(\tau_1, \tau_2, \tau_3)$ for the case of a "memoryless" kernel $\tau_1=\tau_2=\tau_3=0$ just as it should.

The section above provided the description and operation of a method for performing a least squares fit to a Volterra model given a signal excitation whose waveform is of any generalized form. For completeness, we describe in the next section an alternative ensemble-average least squares procedure for extracting the higher order kernels specifically using a white Gaussian excitation.

The zero-th order fitting error is determined from the following expression:

$$E = \overline{[y(t)-z(t)]^2} = \overline{[h_0 - z(t)]^2} \quad (10)$$

where: E is the ensemble-averaged squared error, y(t) is the modeled fit of the signal response, z(t) is the measured response, and $h_0$ is the zero-th order kernel.

The overbar in equation (10) represents ensemble averages of the squared terms within brackets. From (10), it immediately follows:

$$\frac{1}{2}\left(\frac{\partial E}{\partial h_0}\right) = \overline{[h_0 - z(t)]^2} \quad (11)$$

with optimum solution, $$h_0 = \overline{z(t)} \quad (12)$$

Following substitution of (12) into (10), one obtains:

$$E_{min} = \overline{[z(t) - \overline{z(t)}]^2} = \overline{z^2(t)} - \overline{z(t)}^2 \quad (13)$$

Therefore the minimum error, $E_{min}=\sigma_z^2$ where $\sigma_z^2$ is the variance or power in z.

The first order fitting procedure is shown in the following equations:

$$E = \overline{[y(t)-z(t)]^2} = \overline{\left[h_0 + \int d\tau_1 h_1(\tau_1)x(t-\tau_1) - z(t)\right]^2} \quad (14)$$

$$\frac{1}{2}\left(\frac{\partial E}{\partial h_0}\right) = \quad (15)$$

$$\overline{\left[h_0 + \int d\tau_1 h_1(\tau_1)x(t-\tau_1) - z(t)\right]} = \overline{h_0 - z(t)} \text{ since } \overline{x(t)} = 0$$

Therefore the optimum least squares solution with respect to $h_0$ is given by:

$$h_0 = \overline{z(t)} \quad (16)$$

With respect to kernel $h_1(\tau_1)$, one obtains the following least squares solution:

$$\frac{1}{2}\left(\frac{\partial E}{\partial h_1(\tau_a)}\right) = \overline{\left[h_0 + \int d\tau_1 h_1(\tau_1)x(t-\tau_1) - z(t)\right]x(t-\tau_a)} \quad (17)$$

$$= \int d\tau_1 h_1(\tau_1)N_d\delta(\tau_1 - \tau_a) - R_1(\tau_a)$$

where: $R_1(\tau_a) = \overline{z(t)x(t-\tau_a)}$ $N_d$ is the double-sided white spectral level of x(t) in watts/Hz, and $\delta(\tau_1-\tau_a)$ is a delta function.

The optimal first order kernel solution is:

$$h_1(\tau_a) = (1/N_d)R_1(\tau_a) \quad (18)$$

and the minimum error for first order is given by:

$$E_{min} = \overline{z(t)\left[z(t) - h_0 - \int d\tau_1 h_1(\tau_1) x(t-\tau_1)\right]} \quad (19)$$

$$= \overline{z^2(t)} - \overline{z(t)}^2 - \int d\tau_1 h_1(\tau_1) R_1(\tau_1)$$

$$= \sigma_z^2 - \left(\frac{1}{N_d}\right) \int d\tau_1 R_1^2(\tau_1)$$

$$= \sigma_z^2 - N_d \int d\tau_1 h_1^2(\tau_1)$$

The second order fitting procedure is shown in the following:

$$E = \overline{\left[h_0 + \int d\tau_1 h_1(\tau_1)x(t-\tau_1) + \int\int d\tau_1 d\tau_2 h_2(\tau_1, \tau_2)x(t-\tau_1)x(t-\tau_2) - z(t)\right]^2} \quad (20)$$

$$\frac{1}{2}\left(\frac{\partial E}{\partial h_0}\right) = h_0 + \int\int d\tau_1 d\tau_2 h_2(\tau_1, \tau_2) N_d \delta(\tau_1, \tau_2) - \overline{z(t)} \quad (21)$$

$$\overline{z(t)} = h_0 + N_d \int d\tau_1 h_2(\tau_1, \tau_2) \quad (22)$$

$$\tfrac{1}{2}(\partial E/\partial h_2(\tau_a)) = \int d\tau_1 h_1(\tau_1)\overline{x(t-\tau_1)x(t-\tau_a)} - R_1(\tau_a) \quad (23)$$

Setting the derivative on the left hand side to zero, one therefore obtains:

$$h_1(\tau_a) = (1/N_d) R_1(\tau_a) \quad (24)$$

$$\frac{1}{2}\left(\frac{\partial E}{\partial h_2(\tau_a, \tau_b)}\right) = h_0 R_w(\tau_a - \tau_b) + \quad (25)$$

$$\int\int d\tau_2 d\tau_2 h_2(\tau_1, \tau_2)\overline{x(t-\tau_1)x(t-\tau_2)x(t-\tau_a)x(t-\tau_b)} -$$

$$R_2(\tau_a - \tau_b)$$

where:

$$R_w(\tau_a - \tau_b) = \overline{x(t-\tau_a)x(t-\tau_b)}, \text{ and}$$

$$R_2(\tau_a - \tau_b) = \overline{z(t)x(t-\tau_a)x(t-\tau_b)}.$$

Equation (25) can be rewritten as:

$$\frac{1}{2}\left(\frac{\partial E}{\partial h_2(\tau_a, \tau_b)}\right) = R_W(\tau_a - \tau_b)\left[h_0 + N_d \int d\tau_1 h_2(\tau_1, \tau_2)\right] + \quad (26)$$

$$2 N_d^2 h_2(\tau_a, \tau_b) - R_2(\tau_a - \tau_b)$$

Using equation (22), the optimum least squares solution becomes:

$$2 N_d^2 h_2(\tau_a, \tau_b) = R_2(\tau_a - \tau_b) - \overline{z(t)} R_w(\tau_a - \tau_b) \quad (27)$$

$$= \overline{[z(t) - \overline{z(t)}]x(t-\tau_a)x(t-\tau_b)}$$

Solving for $h_2(\tau_a, \tau_b)$ in equation (27) and substituting into equation (22), one obtains:

$$h_0 = \overline{z(t)} - N_d \int d\tau_1 h_2(\tau_1, \tau_1) \quad (28)$$

$$= \overline{z(t)} - \left(\frac{1}{2N_d}\right) \int d\tau_1 [R_2(\tau_1, \tau_2) - \overline{z(t)} R_W(0)]$$

$$= \overline{z(t)} - \left(\frac{1}{2N_d}\right) \int d\tau_1 \overline{[z(t) - \overline{z(t)}]x^2 z(t-\tau_1)}$$

$$E_{min} = \overline{z(t)\left[z(t) - h_0 - \int d\tau_1 h_1(\tau_1)x(t-\tau_1) - \int\int dt_1 d\tau_2 h_2(\tau_1, \tau_2)x(t-\tau_1)x(t-\tau_2)\right]} \quad (29)$$

Substituting for the optimum kernels, one obtains:

$$E_{min} = \sigma_z^2 - \left(\frac{1}{N_d}\right) \int d\tau_1 R_1^2(\tau_1) - \quad (30)$$

$$\left(\frac{1}{2N_d^2}\right) \int\int d\tau_1 d\tau_2 [R_2(\tau_1, \tau_2) - \overline{z(t)} R_w(\tau_1 - \tau_2)]^2$$

$$= \sigma_z^2 - N_d \int d\tau_1 h_1^2(\tau_1) - 2 N_d^2 \int\int d\tau_1 d\tau_2 h_2^2(\tau_1 - \tau_2)$$

The double integral on $\tau_1, \tau_2$ above is given by:

$$\int\int d\tau_1 d\tau_2 \{\overline{[z(t) - \overline{z(t)}]x(t-\tau_1)x(t-\tau_2)}\}^2 = \int\int d\tau_1 T_2^2(\tau_1, \tau_2) \quad (31)$$

where $T_2(\tau_1, \tau_2)$ is defined by the above expression in brackets.

In fitting the third order, from the optimum kernels derived above, it can be shown that:

$$E_{min} = \sigma_z^2\left(\frac{1}{N_d}\right)\int d\tau_1 R_1^2(\tau_1) - \left(\frac{1}{2N_d}\right)\int\int d\tau_1 d\tau_2 T_2^2(\tau_1, \tau_2) - \quad (32)$$

$$\left(\frac{1}{6N_d^3}\right)\int\int\int d\tau_1 d\tau_2 d\tau_3 [T_3(\tau_1, \tau_2, \tau_3) -$$

$$R_1(\tau_1) R_W(\tau_2 - \tau_3) - R_1(\tau_2) R_W(\tau_1 - \tau_3) - R_1(\tau_3) R_W(\tau_1 - \tau_2)]^2$$

where $T_3(\tau_1, \tau_2, \tau_3) = \overline{[z(t)x(t-\tau_1)x(t-\tau_2)x(t-\tau_3)]}$ In summary, by considering $E_{min}$ for successively higher orders, the proper order of the fit can be ascertained. The model order consistent with the best fit (i.e., that which provides the smallest error in the least squares sense) yields the proper order of the fit.

Given a solution for kernels $\{h_K(\tau_1, \ldots, \tau_K)\}$, the detection enhancement feature of our method follows immediately, because the channel/target response can be used as an optimum predictor, as was illustrated in FIG. 2, to estimate the signal and noise interference for determining the likelihood ratio (LR) processor for a particular environment.

The proposed method has an advantage over conventional methods in that the kernels $\{h_K(\tau_1, \ldots, \tau_K)\}$ are determined empirically from the Volterra model using measured values of the excitation input and receiver output. The least squares method also provides higher model accuracy than standard correlation methods since "least squares" has more degrees of freedom. By determining the channel/target response, namely the kernels {$h_K(\tau_1, \ldots, \tau_K)$}, one can also determine the probability density distributions with which to compute the optimum Likelihood Ratio (LR) for a prescribed signal processor.

The active sonar detection enhancement method and apparatus is applicable to any situation which utilizes the transmission, propagation, and reception of active underwater acoustic signals. It is particularly useful in marine environments in which nonlinearity may be a dominant factor, such as arising from irregular bottom and surface interactions, nonlinear resonant scattering within the propagation channel or any other non-homogeneous responses due to channel and/or target interaction.

It will be appreciated by those skilled in the art that the invention could be implemented for testing and/or operation using a suitable programmed general purpose computer or special purpose hardware, with program routines or logical circuit sets performing as processors. Such routines or logical circuit sets may also be referred to as processors or the like.

Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for detecting sonar signals, said method comprising:
   providing an excitation signal for in-water transmission of an acoustic signal;
   providing a response signal produced responsively to said in-water transmission of said acoustic signal; and
   determining a plurality of impulse responses utilizing said response signal and said excitation signal in a Volterra Series Expansion, said Volterra Series Expansion being sufficiently generalized such that said Volterra Series Expansion comprises a plurality of Volterra kernel orders and can include orders above a second-order Volterra kernel.

2. The method of claim 1 wherein said excitation signal and said response signal are the only signals required for said determining of said plurality of impulse responses.

3. The method of claim 1 wherein said step of determining a plurality of impulse responses further comprises utilizing a least squares method in conjunction with said Volterra Series Expansion, said least squares method calculating a least squares error.

4. The method of claim 3 wherein said least squares method is utilized by comparing said plurality of impulse responses with said response signal and determining which order of said Volterra kernels minimizes said least squares error.

5. The method of claim 4 wherein said step of determining said plurality of impulse responses further comprises progressively solving for higher orders of said plurality of impulse responses comprising orders higher than said second-order Volterra kernel.

6. The method of claim 5 further comprising the step of determining which higher order of said plurality of impulse responses minimizes said least squares error.

7. The method of claim 5 wherein said step of determining said plurality of impulse responses further comprises:
   selecting a Volterra Series Expansion of any order k; and
   forming a system of inatrix equations from the excitation signal and the Volterra series expansion.

8. The method of claim 7 further comprising linearly manipulating said matrix equations.

9. A system for detecting sonar signals, said system comprising:
   an acoustic signal transmitter for producing a transmitted acoustic signal, said transmitted acoustic signal being selected from any of a group of waveform transmission tyoes comprising frequency modulated signals, continuous wave signals and white Gaussian signals;
   an acoustic receiver, a received acoustic signal. produced responsively to said transmitted acoustic signal; and
   a processor joined to said acoustic signal transmitter and said acoustic receiver to utilize a Volterra Series Expansion comprising a plurality of Volterra kernel orders to compute a plurality of channel and target impulse responses.

10. The system of claim 9 wherein said processor is capable of comparing said plurality of channel and target impulse responses with said received acoustic signal to determine an error signal.

11. The system of claim 10 wherein said processor is capable of computing said plurality of channel and target impulse responses at a plurality of orders comprising Volterra kernel orders greater than a second-order Volterra kernel.

12. The system of claim 11 wherein said processor is capable of determining at which of said plurality of orders said error signal is minimized.

13. The system of claim 9 wherein said acoustic signal transmitter transmits a continuous wave signal.

14. The system of claim 9 wherein said acoustic signal transmitter transmits a frequency modulated signal.

15. The system of claim 9 wherein said acoustic signal transmitter transmits a broadband white noise signal.

16. A method for enhancing detection of sonar signals comprising:
   providing an excitation signal for transmission of an acoustic signal;
   receiving a return signal from said transmitted acoustic signal;
   determining an estimated channel response and estimated target response using a Volterra Series Expansion;
   comparing said estimated channel response and said estimated target response with said return signal to determine an error; and
   solving for Volterra kernels of progressively higher order.

17. The system of claim 16 wherein said step of determining further comprises calculating said Volterra Series Expansion at each of a plurality of orders comprising orders greater than a second-order Volterra kernel.

18. The system of claim 17 wherein said step of determining further comprises selecting at least one order from said plurality of orders for which said error is minimized.

19. The system of claim 18 further comprising estimating channel noise utilizing said estimated channel response and said estimated target response.

20. The system of claim 19 further comprising the step of determining an acoustic signature of said target utilizing said estimated channel response and said estimated target response.

* * * * *

UNITED STATES PATENT AND TRADEMARK OFFICE
CERTIFICATE OF CORRECTION

| | |
|---|---|
| PATENT NO. | : 6,714,481 B1 |
| APPLICATION NO. | : 10/263299 |
| DATED | : March 30, 2004 |
| INVENTOR(S) | : Richard A. Katz et al. |

It is certified that error appears in the above-identified patent and that said Letters Patent is hereby corrected as shown below:

Cover page, block (75) Inventors, replace "Nuttal" with --Nuttall--.

Signed and Sealed this

Fifth Day of December, 2006

JON W. DUDAS
*Director of the United States Patent and Trademark Office*